No. 729,031. Patented May 26, 1903.

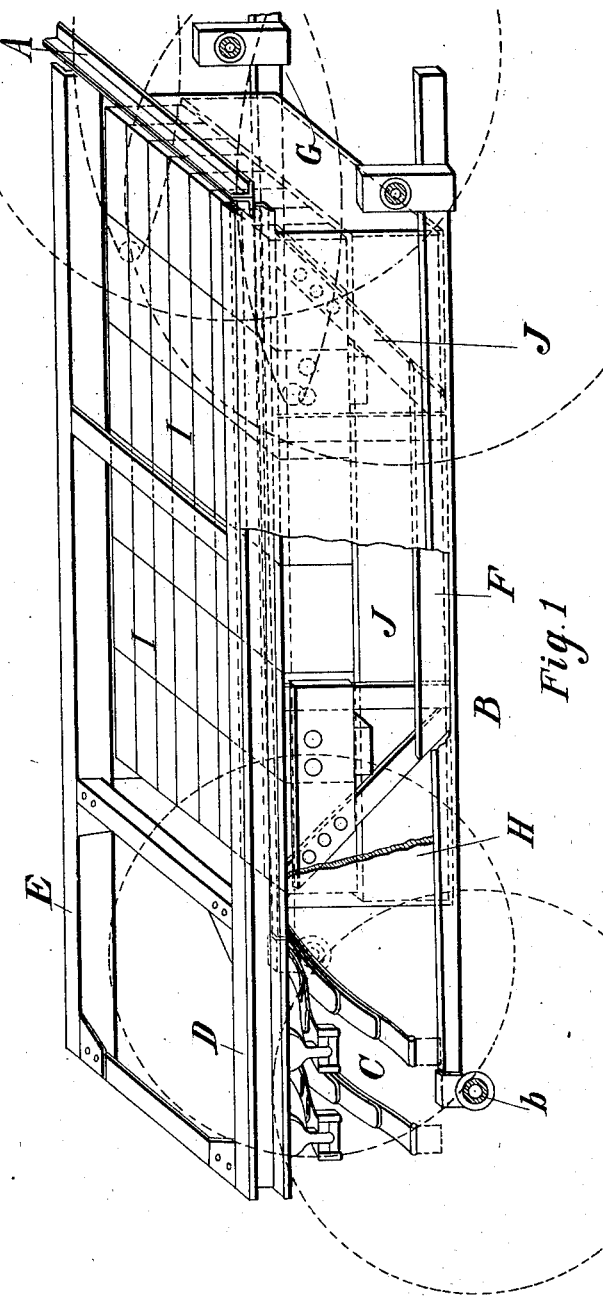

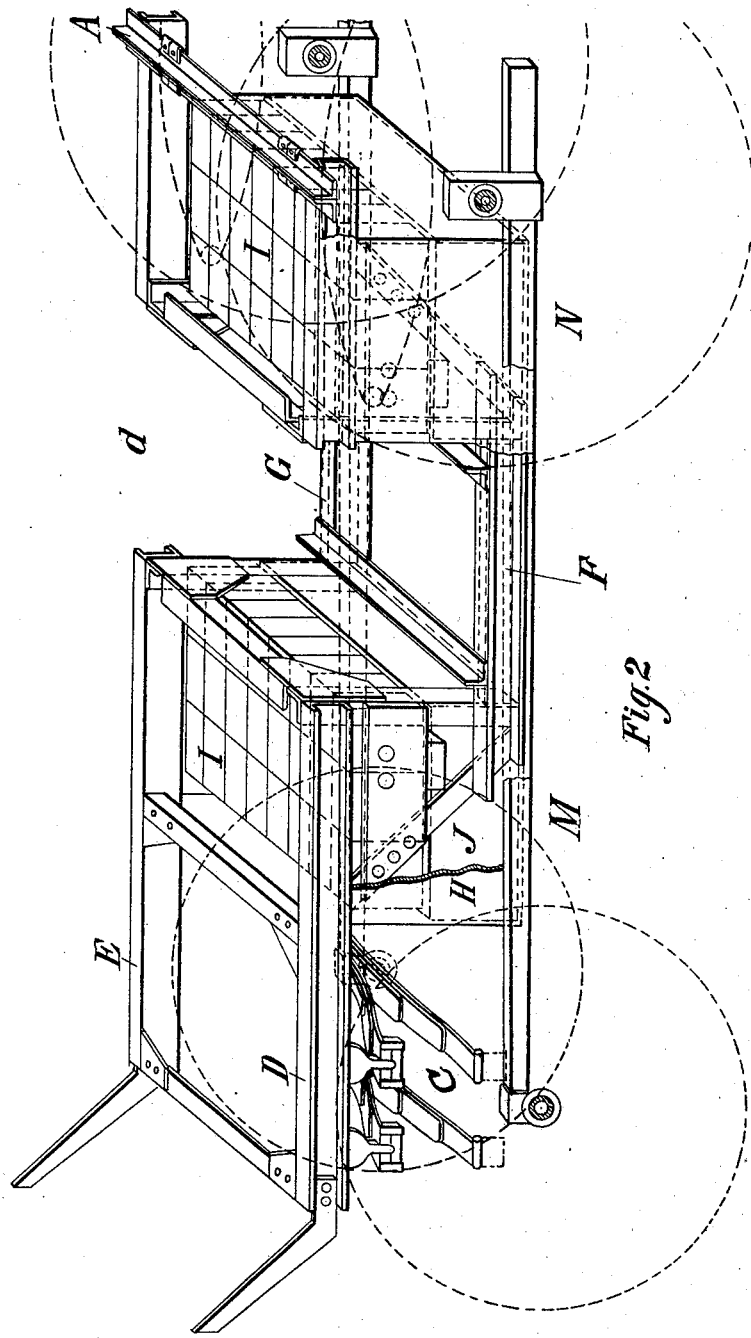

UNITED STATES PATENT OFFICE.

HAROLD BEDFORD ATKINS, OF NEW YORK, N. Y., ASSIGNOR, BY MESNE ASSIGNMENTS, TO MORTON TRUST COMPANY, TRUSTEE, A CORPORATION OF NEW YORK.

VEHICLE RUNNING-GEAR.

SPECIFICATION forming part of Letters Patent No. 729,031, dated May 26, 1903.

Application filed August 21, 1899. Serial No. 727,910. (No model.)

*To all whom it may concern:*

Be it known that I, HAROLD BEDFORD ATKINS, a citizen of the United States of America, and a resident of the city of New York, county of New York, and State of New York, have invented certain new and useful Improvements in Truss-Frame Vehicle Running-Gear, of which the following is a specification.

My invention relates to improvements in vehicles, and is especially useful in connection with automobiles or motor-vehicles of the type propelled by electric motors spirited by current from storage or other batteries carried upon the vehicle.

The object of the invention is to provide a light but strong construction of running-gear or frames which will be able to sustain the weight of the battery from which current is supplied to operate the propelling-motor and which will at the same time form a platform for a detachable body and to do this in such a way that the vehicle is complete, as far as operation goes, without the body. The battery referred to comprises the desired number of cells, which are permanently arranged in a tray, which tray, with its load, is handled as a unit and is attached so as to depend from the aforesaid platform and be readily detached therefrom when exhausted and replaced by a similar unit charge. The tray of batteries is applied to the running-gear of the vehicle from below and hangs suspended from suitable supports connected therewith.

This invention does not relate to the battery or to the tray in which the same is contained, but to the construction of the frame of the vehicle running-gear, which is particularly adapted to accomplishing two ends—viz., to form a strong and rigid support for the tray of battery and at the same time to form a platform for a detachable vehicle-body.

The details of construction will appear in connection with the accompanying drawings, in which—

Figure 1 is a view in perspective with parts broken away, showing a running-gear embodying the invention. Fig. 2 is a similar view, also in perspective, showing the invention adapted for use in connection with a drop-center body.

The object is accomplished by extending the sides of the battery-box longitudinally, making two longitudinal trusses and supporting these trusses on the springs of the vehicle and tying these together by cross-pieces, made as light as possible to give the requisite strength, and in extending the ends of the trusses to form the platform to sustain the vehicle-body.

Fig. 1 shows a construction adapted to carry any body which may be flat on the bottom, such as a delivery-wagon. The near truss B only is fully shown, the other one being exactly similar. A cross member A, connecting the rear ends of both the trusses, rests on the rear springs over the rear axle and supports the rear ends of the trusses, made with upper chords D E resting on the front springs C, but not of necessity as long as the vehicle-body, although long enough to support it, and lower chords F G, braced and tied to the upper chords, forming the trusses and giving sufficient strength to carry the weight of the battery wherever it is desired to hang it. The battery is indicated by a group of cells I, which is arranged in a suitable receptacle or tray J, so that the whole may be handled as a single unit. The battery is arranged in the space between the trusses, which is termed the "battery-box," and for protection from external influences a light casing H is fitted around the outside of the truss-frames and across the ends of the space occupied by the battery. Fig. 2 shows the same general construction with a central piece cut out, dividing the battery-box into two parts M N and forming a central space $d$ to accommodate drop-center bodies, such as landau, coach, or brougham bodies. The battery-box is indicated at M N and comprises the spaces fore and aft of the central opening $d$ and may be, as in Fig. 1, inclosed by a simple light casing H, which will protect it from the elements and at the same time being fitted upon the exterior of the truss-frames covers the latter and presents a neat and ornamental appearance. The construction of the trusses is alike in both instances, the difference being that, as indicated in Fig. 2, a portion of each of the upper chords D E is cut away, leaving the open space $d$, while the lower chords are made stronger. It is to be noted that in either case the upper chords of the truss are substantially parallel and continue in the same plane even in the case of the device shown in Fig. 2, the opening in the latter case being permitted by depressing the lower chords. Thus the truss-frames form what is practically a rocker plate or frame for the body of the vehicle and one which is sufficiently strong and suited in form and size to withstand the great strains incidental to sustaining the weight of heavy batteries upon it. The upper surfaces formed by the truss-frames and their crossties provides what is practically a supporting floor or skeleton frame to which the vehicle-body may be readily and conveniently applied.

It will be readily seen that an ordinary vehicle body and frame, while suited to its purposes, would never be able to withstand the severe strains to which automobiles are subjected, and only by making the frames of the vehicles extremely heavy or making them lighter and so trussing them that they will withstand the extra strains is it possible to obtain sufficient strength to withstand the strains due to the added weight of the batteries. In the present case the truss-frames not only offer sufficient resistance to the vertical strains, but the very arrangement of the lower chords and braces, which with the upper parallel chords form the trusses, provide more or less of a transverse support for the batteries. The resulting advantages are manifold and obvious, while leaving the necessary space for the battery-compartment unobstructed from below. With this arrangement the battery-box is necessarily divided into two parts, one in the front and one in the rear, in each of which is located a portion of the total battery carried by the vehicle, the particular advantage of my construction being that the frame or running-gear of the wagon is, by means of the trusses described, made light and at the same time sufficiently strong to carry the storage battery, notwithstanding the central cut in the upper chords, thereby enabling me to construct a running-gear to receive a drop-center body, which running-gear shall be in itself sufficiently strong and rigid as to safely sustain the weight of the two portions of the storage battery without depending upon the body or other structure for the necessary strength. As indicated, the upper chords of the frame are prolonged, so as to afford a platform at each end to receive the desired body and springs of the usual type, which are indicated as interposed between the extremities of the platform as formed and the axles of the supporting-wheels. Thus it will be noted that the construction shown comprises a truck complete with driving means and source of power all mounted ready for use as it stands irrespective of any body—that is, the construction affords a means of properly supporting a body—spring-held in those parts where they should be in order that the whole will be a self-contained truck, permitting flexibility of the wheel-base for common road uses and strong support for the heavy storage-battery complement and adapted to receive and carrying a body which need not in itself be especially designed to meet any conditions of strength required for the support and proper mounting of the motive mechanism. Such a truck is substantially ready for road usage, as far as the main elements are concerned, and can be complete in itself irrespective of the nature of the body to be attached, which of course may furthermore be changed at will and is susceptible of attachment by the simplest possible means instead of requiring the reinforcement of parts or extensive work, which has heretofore been usually required to adapt bodies for motor-vehicle purposes, and particularly for electric vehicle purposes, where the weight of the batteries imposes extreme conditions.

In the construction shown in Fig. 1 a greater lightness is obtained, because although the upper chord of the truss is continuous the lower can be made much lighter on account of the increased strength due to carrying the upper chord through the whole length of the running-gear.

Of course it is quite immaterial that the truss-frames as shown herein are made up of separable parts secured together, as by bolting or riveting, as it is perfectly apparent that the rocker plate or frame might be made up of trusses formed from metal in continuous lengths bent in the required truss forms in any desired manner.

Having described my invention, what I claim is—

1. As an article of manufacture a complete self-contained wheeled truck with flexible wheel-base comprising longitudinal members directly connecting the axles or wheels carrying members, whereby said axles are held in substantial parallelism the wheel-base in its initial substantial rectangular form, while at the same time permitting the necessary degree of warping, other longitudinal members interconnected and together independently forming a substantially inflexible platform and adapted to receive a vehicle-body directly superimposed thereon, springs supporting the latter near the ends of the truck, substantially above the axle.

2. The combination in a running-gear for vehicles, of longitudinal members severally and separately connecting the axles or wheel-carrying members, said axles and longitudinal members together constituting a frame permitting flexibility in a vertical direction and preventing relative displacement of the axles in a horizontal direction, other longitudinal members spring-supported at their ends and adapted to receive a vehicle-body, and said second set of longitudinal members disposed substantially parallel and trussed to withstand vertical strains.

3. The combination in a running-gear for vehicles, of longitudinal members connecting the axles or wheel-carrying members, other longitudinal members spring-supported at their ends and adapted to receive a vehicle-body, said second longitudinal members vertically trussed and disposed to form a downwardly-open compartment for the reception of a battery-tray, the longitudinal members connecting axles being disposed on the sides of the downwardly-open compartment.

4. The combination in a running-gear for road-vehicles, of longitudinal members connecting the axles or transverse wheel-carrying members, other longitudinal members spring-suspended above the first members and having a central drop portion to accommodate the downwardly-extending body portion, two sets of longitudinal members so disposed as to form two downwardly-open compartments located respectively in front of and to the rear of the central drop portion.

5. The combination in a running-gear for road-vehicles, of substantially parallel longitudinal members projecting from axle to axle, said members having a central depending portion adapted to withstand vertical strain, springs interposed between the said longitudinal members and the wheel-carrying members, transverse members rigidly connecting the longitudinal members, the transverse and longitudinal members together forming downwardly-open compartments adapted to receive and support the battery-tray.

6. The combination with the front and rear wheels of a vehicle and their supporting-axles, of frames arranged between them, said frames spring-suspended above and clear of the axles and comprising an upper chord and lower chord, and intermediate connections forming truss-frames adapted to sustain vertical strains applied between the axles.

7. The combination with the front and rear wheels and supporting-axles of a vehicle running-gear, of truss-frames extending between the axles and arranged in parallelism said frames spring-supported and above said axles, the truss-frames formed with dependent trusses adapted to sustain vertical strains applied between the axles.

8. The combination with the wheels and supporting-axles of a vehicle, of a supporting-frame, complete in itself and adapted for the reception of a vehicle-body directly superimposed thereon, comprising truss members arranged in parallel vertical planes and having their upper chords lying substantially in the same plane and forming a supporting-frame for a vehicle-body, and cross-ties adapted to hold the truss-frames in their relative parallel arrangement.

9. The combination with the wheels and supporting-axles of a vehicle running-gear, of a frame adapted to support a body, said frame comprising trusses and cross-ties, the former arranged to resist vertical strains upon the supporting-frame, said trusses spring-supported above the axles, a storage-battery receptacle, the depending portions of the frame forming a compartment within which said battery is sustained.

10. The combination with the wheels and supporting-axles of a vehicle, a frame comprising trussed members having their upper chords lying substantially in the same plane and forming with cross-ties a skeleton frame adapted to directly support a body, said trussed frames having a transverse opening extending to and bounded by the lower chords of the truss and spring-suspended above the axles.

11. The combination with the wheels and supporting-axles of a vehicle running-gear, of a supporting-frame for the body comprising trussed members arranged in substantially parallel vertical planes and having their upper chords cut away forming a transverse pocket, said pocket bounded by the lower chords of the truss and forming at either side thereof, a compartment for the battery.

12. The combination with the wheels and supporting-axles of a vehicle running-gear, a substantially rectangular frame of skeleton form adapted to receive and support a vehicle-body, said frame including parallelly-disposed trussed members and having an open transverse dependent portion bounded by the lower chord and supporting members of the truss, the frame as a whole forming compartments on opposite sides of the pocket to receive the batteries.

13. The combination with the wheels and supporting-axles of a vehicle running-gear, a frame complete in itself and adapted to receive and support a vehicle-body, said frame having a dependent open portion extending from side to side thereof, the frame as a whole braced as to its dependent portion to withstand vertical strains.

Signed by me at New York, N. Y., this 16th day of August, 1899.

HAROLD BEDFORD ATKINS.

Witnesses:
RUDOLPH PRAAST,
FRANKLAND JANNUS.